(12) United States Patent
Matsumoto

(10) Patent No.: US 11,768,725 B2
(45) Date of Patent: Sep. 26, 2023

(54) IMAGE FORMING APPARATUS WITH MULTIPLE CASSETTES AND DETERMINATION PORTION TO DETERMINE A PROHIBITED OPERATION

(71) Applicant: CANON KABUSHIKI KAISHA, Tokyo (JP)

(72) Inventor: Hiroshi Matsumoto, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 17/584,429

(22) Filed: Jan. 26, 2022

(65) Prior Publication Data

US 2022/0245015 A1 Aug. 4, 2022

(30) Foreign Application Priority Data

Feb. 1, 2021 (JP) .................................. 2021-014396

(51) Int. Cl.
*G06F 11/07* (2006.01)
*H04N 1/00* (2006.01)

(52) U.S. Cl.
CPC ..... *G06F 11/0733* (2013.01); *H04N 1/00538* (2013.01); *H04N 1/00824* (2013.01)

(58) Field of Classification Search
CPC ............ G06F 11/0733; H04N 1/00538; H04N 1/00824
USPC .................................................. 358/1.1–1.18
See application file for complete search history.

(56) References Cited

U.S. PATENT DOCUMENTS

| 2011/0076073 A1* | 3/2011 | Omata | G03G 15/6585 |
| | | | 399/341 |
| 2014/0055815 A1* | 2/2014 | Gabe | G06K 15/4065 |
| | | | 358/1.15 |
| 2017/0087883 A1* | 3/2017 | Matsui | B41J 11/0075 |
| 2018/0147865 A1* | 5/2018 | Harada | B41J 13/103 |

FOREIGN PATENT DOCUMENTS

JP 2007-230774 A 9/2007

* cited by examiner

*Primary Examiner* — Gabriel I Garcia
(74) *Attorney, Agent, or Firm* — VENABLE LLP

(57) ABSTRACT

An image forming apparatus includes a connection portion to which a first optional device and a second optional device are selectively detachably connectable, and a determination portion configured to determine whether to prohibit an operation of the image forming apparatus. A plurality of first optional devices are stacked and connectable to the image forming apparatus. The second optional device is installed on a floor and is connectable to the first optional device. In a case in which the second optional device is not connected and the first optional devices of a number larger than a first threshold value are connected to the image forming apparatus, and in a case in which the second optional device is connected and the first optional devices of a number larger than a second threshold value are connected to the image forming apparatus, the determination portion prohibits the operation of the image forming apparatus.

14 Claims, 10 Drawing Sheets

IMAGE FORMING APPARATUS WITH MULTIPLE CASSETTES AND DETERMINATION PORTION TO DETERMINE A PROHIBITED OPERATION

BACKGROUND OF THE INVENTION

Field of the Invention

The present invention relates to an image forming apparatus to which an optional device is connectable.

Description of the Related Art

Conventionally, there is an image forming apparatus in which a plurality of optional cassettes configured to feed sheets can be stacked and mounted below a main body of the image forming apparatus, wherein the sheets are conveyed from the optional cassettes to an image forming portion through a sheet conveying path in the optional cassettes and a sheet conveying path in the main body. An image forming apparatus disclosed in Japanese Patent Application Laid-Open No. 2007-230774 is configured so that an optional cassette can be added below the main body. By adding the optional cassette, a large number of sheets can be fed and different types of sheets can be selected for use.

However, in a case in which a user purchases optional cassettes separately and connects them to the image forming apparatus, there is concern that optional cassettes of a number exceeding an expected number is connected to the image forming apparatus.

SUMMARY OF THE INVENTION

The present invention provides an image forming apparatus of which an operation is prohibited in a case in which optional devices of a number larger than a threshold value are connected to the image forming apparatus.

An image forming apparatus according to an embodiment of the present invention, comprising:

an image forming portion configured to form an image on a sheet;

a connection portion to which a first optional device and a second optional device are selectively detachably connectable; and a determination portion configured to determine whether to prohibit an operation of the image forming apparatus, wherein the first optional device is connectable to the connection portion of the image forming apparatus, wherein the first optional device is connectable to another first optional device so that a plurality of first optional devices are stacked and connectable to the image forming apparatus, wherein the second optional device is installed on a floor and is connectable to the connection portion of the image forming apparatus or the first optional device, wherein in a case in which the second optional device is not connected to the image forming apparatus and a number of the first optional devices connected to the image forming apparatus is larger than a first threshold value, the determination portion prohibits the operation of the image forming apparatus, and wherein in a case in which the second optional device is connected to the image forming apparatus and the number of the first optional devices connected to the image forming apparatus is larger than a second threshold value, the determination portion prohibits the operation of the image forming apparatus.

Further features of the present invention will become apparent from the following description of exemplary embodiments with reference to the attached drawings.

DESCRIPTION OF THE EMBODIMENTS (Image Forming Apparatus)

Figure 1:
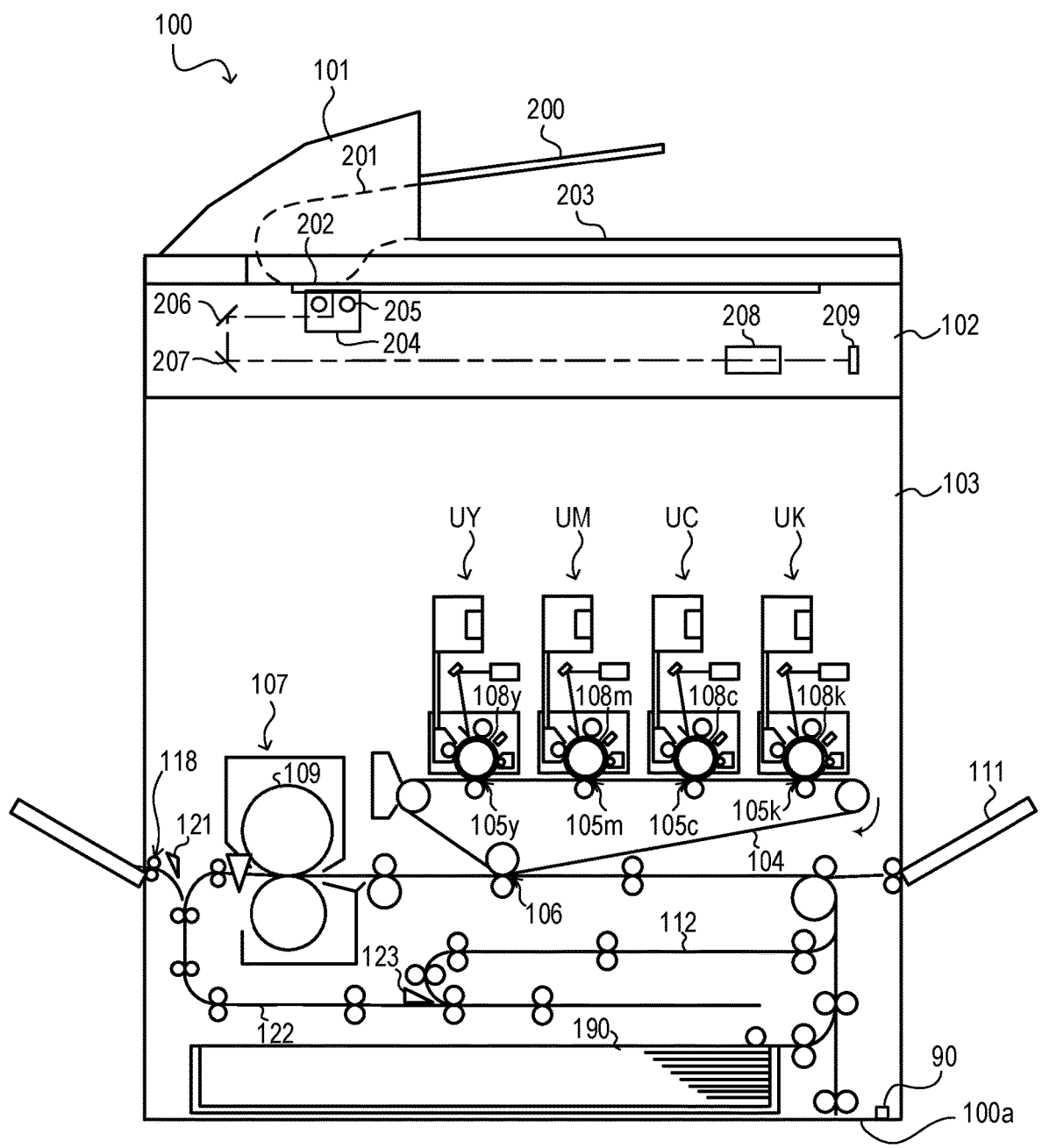
FIG. 1 is a cross-sectional view of an image forming apparatus.

FIG. 1 is a cross-sectional view of an image forming apparatus 100. The image forming apparatus 100 of the embodiment is a digital copying machine which forms an image on a recording medium (hereinafter referred to as a sheet) using an electrophotographic image forming process. However, the image forming apparatus 100 is not limited thereto, and may be an electrophotographic printer (for example, a color laser beam printer, a color LED printer, and so on), an MFP (multifunction peripheral), a facsimile machine, or a printing machine. The image forming apparatus 100 forms a color image, but may also form a monochrome image. The image forming apparatus 100 includes an original feeding device 101, an image reader 102, and a printer 103.

The original feeding device 101 feeds originals one by one from a first page of an original bundle set on an original tray 200 to a platen glass 202 via a curved path 201, conveys the original on the platen glass 202 from left to right, and discharges the original to a discharge tray 203. At this time, a reader scanner unit 204 is held at a predetermined position. The reader scanner unit 204 reads an original by passing the original from left to right on the reader scanner unit 204.

When the original passes on the reader scanner unit 204, a light source 205 of the reader scanner unit 204 irradiates the original with light, and the light reflected from the original is imaged on an image sensor 209 through a mirror 206, a mirror 207 and an imaging lens 208. The image sensor 209 converts the reflected light of the original into image data.

Alternatively, the user may open the original feeding device 101, place the original on the platen glass 202, and close the original feeding device 101. The image sensor 209 can also read the original placed on the platen glass 202 while the reader scanner unit 204 moves from left to right. The image reader 102 carries out an image processing on the image data of the read original and transmits a color separation image signal to the printer 103.

The printer 103 has a first image forming portion UY, a second image forming portion UM, a third image forming portion UC, and a fourth image forming portion UK arranged in tandem. The first image forming portion UY, the second image forming portion UM, the third image forming portion UC, and the fourth image forming portion UK form toner images on the respective photosensitive drums 108$y$, 108$m$, 108$c$, and 108$k$ using an electrophotographic process of a laser exposure type.

Based on the color separation image signal transmitted from the image sensor 209 to the printer 103, the first image forming portion UY forms a yellow toner image on the surface of the photosensitive drum 108$y$. Similarly, the second image forming portion UM forms a magenta toner image on the surface of the photosensitive drum 108$m$. The third image forming portion UC forms a cyan toner image on the surface of the photosensitive drum 108$c$. The fourth image forming portion UK forms a black toner image on the surface of the photosensitive drum 108$k$.

The yellow, magenta, cyan, and black toner images formed on the surfaces of the photosensitive drums 108$y$, 108$m$, 108$c$ and 108$k$ are sequentially transferred onto an intermediate transfer belt 104 by primary transfer portions 105$y$, 105$m$, 105$c$, and 105$k$, respectively. The four toner images are superimposed to form an unfixed full-color toner image on the intermediate transfer belt 104.

On the other hand, the sheet is fed to a secondary transfer portion 106 at a predetermined control timing from a cassette feeding mechanism portion 190 or a manual feeding portion 111. A sheet cassette (hereinafter referred to as a first optional cassette) 191 (FIG. 3A) or a sheet cassette (hereinafter referred to as a second optional cassette) 192 (FIG. 3B), which will be described later, can be optionally connected to the image forming apparatus 100. A bottom portion of the image forming apparatus 100 is provided with a connection portion 100$a$ to which the first optional cassette 191 and the second optional cassette 192 are selectively detachably connectable. In a case in which the first optional cassette 191 or the second optional cassette 192 is connected to the image forming apparatus 100, a sheet is fed from the first optional cassette 191 or the second optional cassette 192 to the secondary transfer portion 106 at a predetermined control timing. In the secondary transfer portion 106, the full-color toner image on the intermediate transfer belt 104 is transferred to the sheet.

The sheet is separated from the intermediate transfer belt 104 and conveyed to a fixing unit 107. In the fixing unit 107, the sheet is nipped by a pair of fixing rollers 109 and conveyed. The unfixed full-color toner image is heated and pressurized by the pair of fixing rollers 109, fused and mixed, and fixed to the surface of the sheet as a full-color permanent fixed image. The sheet leaving the fixing unit 107 is once guided to a path 122 by an inversion flapper 121. After a trailing edge of the sheet passes through the inversion flapper 121, the sheet is switched back and guided to a discharge roller 118 by the inversion flapper 121. As a result, the sheet is discharged from the image forming apparatus 100 by the discharge roller 118 in a state in which the surface on which the image is formed faces downward (face down).

In a case in which a double-sided printing is performed, the sheet passed through the fixing unit 107 is guided to the path 122 by the inversion flapper 121. After the trailing edge of the sheet passes through a duplex flapper 123, the sheet is switched back and guided to a duplex conveyance path 112 by the duplex flapper 123. Thus, the sheet is conveyed to the secondary transfer portion 106, and an image is formed on a back side (second side) of the sheet.

(Controller)

Figure 2:
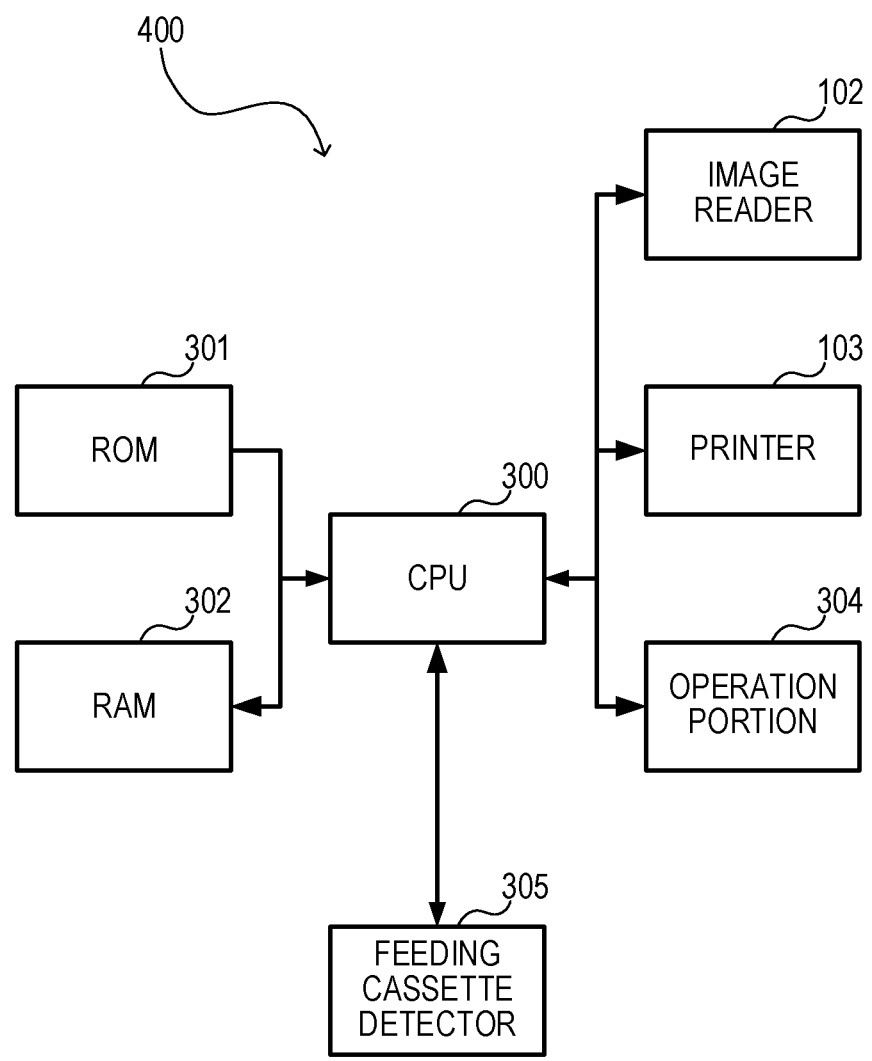
FIG. 2 is a block diagram of a controller of the image forming apparatus.

FIG. 2 is a block diagram of a controller 400 of the image forming apparatus 100. The controller 400 includes a CPU 300, a ROM 301, a RAM 302, and a feeding cassette detector 305. The CPU 300 is electrically connected to the image reader 102, the printer 103, and an operation portion 304. The operation portion 304 is provided on the image forming apparatus 100. The CPU 300 controls all of the image forming apparatus 100. The ROM 301 is a storage portion configured to store a control program to be executed by the CPU 300. The RAM 302 is a storage portion used as a work area necessary for the CPU 300 to control the image forming apparatus 100. The RAM 302 stores image data (digital image data) obtained by reading the original by the image reader 102 and information obtained from the feeding cassette detector 305. The RAM 302 is also used as a work area for the CPU 300 to perform an image processing on the image data obtained from the image reader 102.

The operation portion 304 is used for setting a copy job that the user wants the image forming apparatus 100 to execute and for displaying a message to the user. The CPU 300 conveys the original set on the original tray 200 to the image reader 102 according to a setting from the operation portion 304, reads an image of the original to generate image data, and stores the image data in the RAM 302. The CPU 300 performs necessary image processing on the image data from the image reader 102 according to the copy job setting such as the setting of single-sided printing/double-sided printing from the operation portion 304, and stores the image data for the image to be formed on the sheet in the RAM 302.

(Optional Cassette)

Figure 3A:
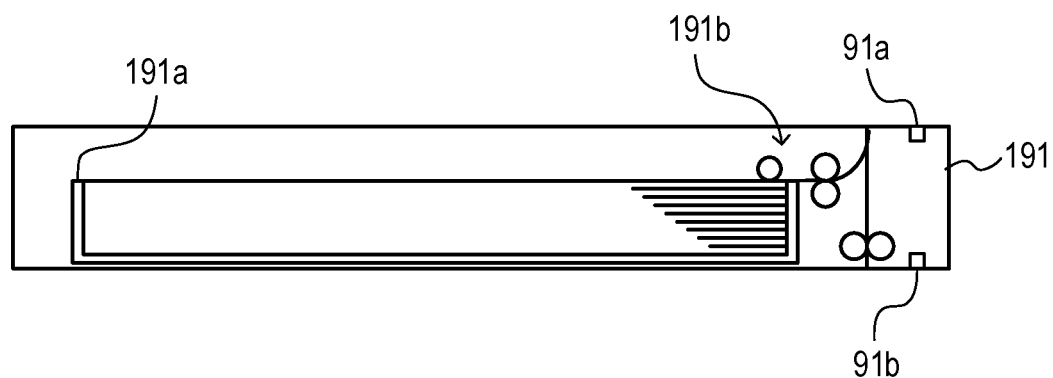
FIG. 3A and FIG. 3B are cross-sectional views of an optional cassette connectable to the image forming apparatus.
Figure 3B:
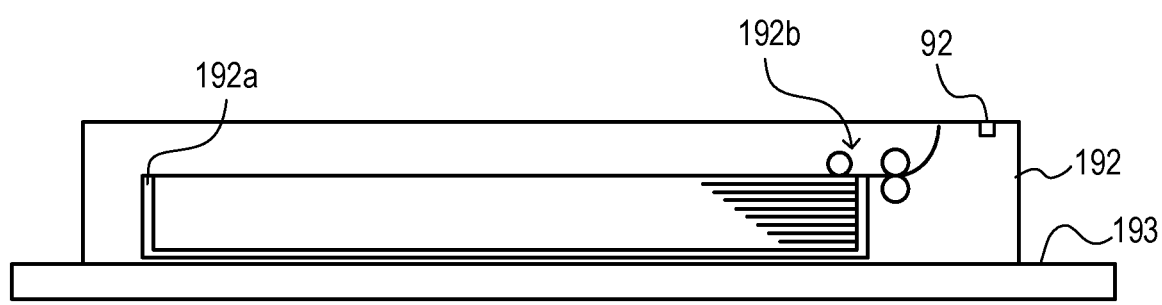

FIG. 3A and FIG. 3B are cross-sectional views of optional cassettes (191, 192) connectable to the image forming apparatus 100. FIG. 3A is a cross-sectional view of the first optional cassette 191. The first optional cassette (first optional device) 191 is a feeding cassette having a sheet containing portion 191$a$ configured to contain sheets and a feeding portion 191$b$ configured to feed sheets one by one from the sheet containing portion 191$a$. The first optional cassette 191 is connectable to the image forming apparatus 100 from below in the vertical direction. An electrical contact 91$a$ is provided on an upper portion of the first optional cassette 191. The first optional cassette 191 is connectable to a bottom portion of the image forming apparatus 100. When the first optional cassette 191 is connected to the bottom portion of the image forming apparatus 100, the electrical contact 91$a$ of the first optional cassette 191 is connected to an electrical contact 90 (FIG. 1) provided at the bottom portion of the image forming apparatus 100. Thus, the feeding cassette detector 305 detects that the first optional cassette 191 is connected to the image forming apparatus 100. That is, when the first optional cassette 191 is connected to the image forming apparatus 100, the feeding cassette detector 305 detects that the first optional cassette 191 is connected to the image forming apparatus 100.

An electrical contact 91$b$ is provided on a lower portion of the first optional cassette 191. The first optional cassette 191 is connected to another first optional cassette 191. A plurality of first optional cassettes 191 as a plurality of first optional devices can be stacked and connected to the image forming apparatus 100. When the first optional cassette 191 and another first optional cassette 191 are connected, the electrical contact 91b of the first optional cassette 191 is connected to the electrical contact 91a of another first optional cassette 191. Thus, when the plurality of first optional cassettes 191 are connected and stacked, the feeding cassette detector 305 can obtain connection information about the plurality of first optional cassettes 191 connected to the image forming apparatus 100. That is, for example, when the two first optional cassettes 191 are stacked and connected to the image forming apparatus 100, the feeding cassette detector 305 detects that the two first optional cassettes 191 are connected to the image forming apparatus 100. In this manner, the feeding cassette detector 305 can detect a number E of the first optional cassettes 191 connected to the image forming apparatus 100. The number E of the first optional cassettes 191 connected to the image forming apparatus 100 is stored in the RAM 302 as feeding cassette information.

FIG. 3B is a cross-sectional view of the second optional cassette 192. The second optional cassette (second optional device) 192 is a feeding cassette having a sheet containing portion 192a configured to contain sheets and a feeding portion 192b configured to feed sheets one by one from the sheet containing portion 192a. The second optional cassette 192 is connectable to the image forming apparatus 100 from below in the vertical direction. An electrical contact 92 is provided on an upper portion of the second optional cassette 192. The second optional cassette 192 is connectable to the bottom portion of the image forming apparatus 100 or the bottom portion of the first optional cassette 191. A bottom plate 193 having an installation floor area larger than an installation floor area of the bottom portion of the first optional cassette 191 is provided on a bottom portion of the second optional cassette 192. The bottom plate 193 makes the second optional cassette 192 less prone to topple than the first optional cassette 191. Neither the first optional cassette 191 nor another second optional cassette 192 can be connected to a bottom portion of the bottom plate 193 of the second optional cassette 192. The second optional cassette 192 is connected to the image forming apparatus 100 as the lowest cassette and installed on the floor.

When the second optional cassette 192 is connected to the bottom portion of the image forming apparatus 100, the electrical contact 92 of the second optional cassette 192 is connected to the electrical contact 90 (FIG. 1) of the image forming apparatus 100. Thus, the feeding cassette detector 305 detects that the second optional cassette 192 is connected to the image forming apparatus 100. Information on whether the second optional cassette 192 is connected to the image forming apparatus 100 is stored in the RAM 302 as feeding cassette information. When the second optional cassette 192 is connected to the bottom portion of the first optional cassette 191 connected to the bottom portion of the image forming apparatus 100, the electrical contact 92 of the second optional cassette 192 is connected to the electrical contact 91b of the first optional cassette 191. Thus, the feeding cassette detector 305 detects that the second optional cassette 192 is connected to the bottom portion of the first optional cassette 191 connected to the bottom portion of the image forming apparatus 100.

(Operation Portion)

Figure 4A:
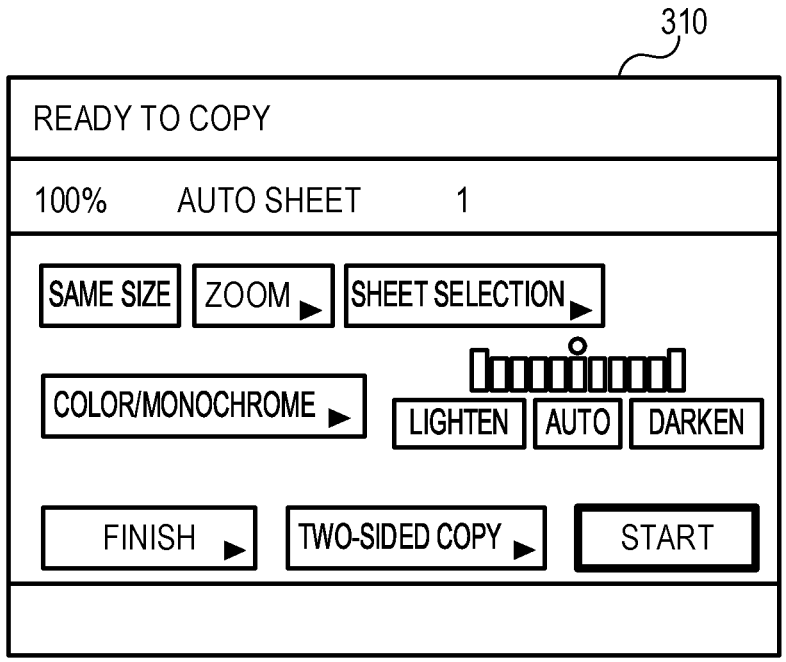
FIG. 4A and FIG. 4B are views showing screens displayed on an operation portion.
Figure 4B:
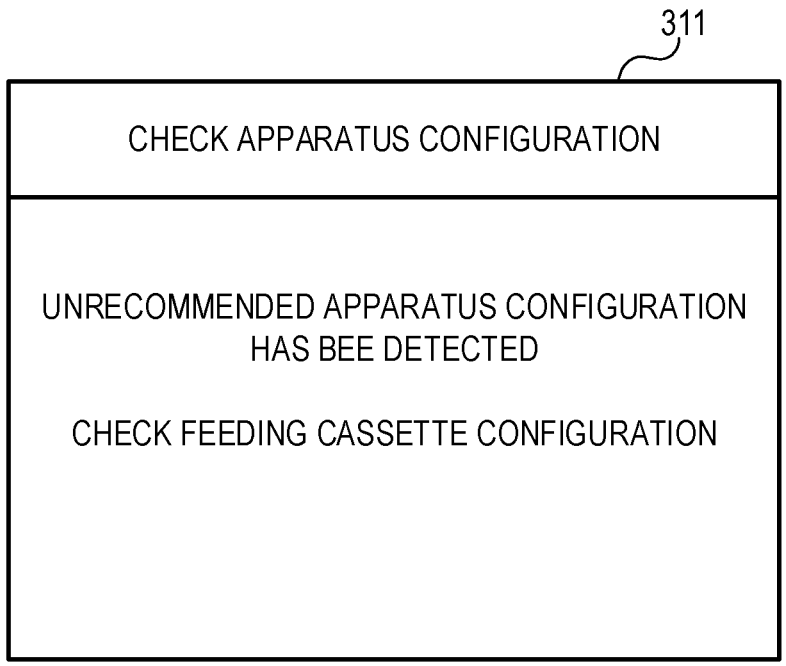

FIG. 4A and FIG. 4B are views showing screens displayed on the operation portion 304. The operation portion 304 comprises a touch panel. FIG. 4A is a view showing an operation screen 310 displayed on the touch panel of the operation portion 304. Soft keys are created on the operation screen 310. The operation screen 310 displays soft keys for setting image forming operations such as zoom, sheet selection, single-sided/double-sided printing instruction, color mode/monochrome mode designation, image density, and finishing. Further, a start key for causing the image forming apparatus 100 to start the image forming operation is displayed on the operation screen 310. When the user touches the start key, the image forming apparatus 100 starts the image forming operation.

FIG. 4B is a view showing a message screen 311 displayed on the touch panel of the operation portion 304. For example, the messages "CHECK APPARATUS CONFIGURATION", "UNRECOMMENDED APPARATUS CONFIGURATION HAS BEEN DETECTED", and "CHECK FEEDING CASSETTE CONFIGURATION" are displayed on the message screen 311. In a case in which the message screen 311 shown in FIG. 4B is displayed on the entire surface of the touch panel of the operation portion 304, the soft keys for setting the image forming operation and the start key are not displayed so that the user cannot set or start the image forming operation of the image forming apparatus 100.

(Image Forming Operation)

Figure 5:
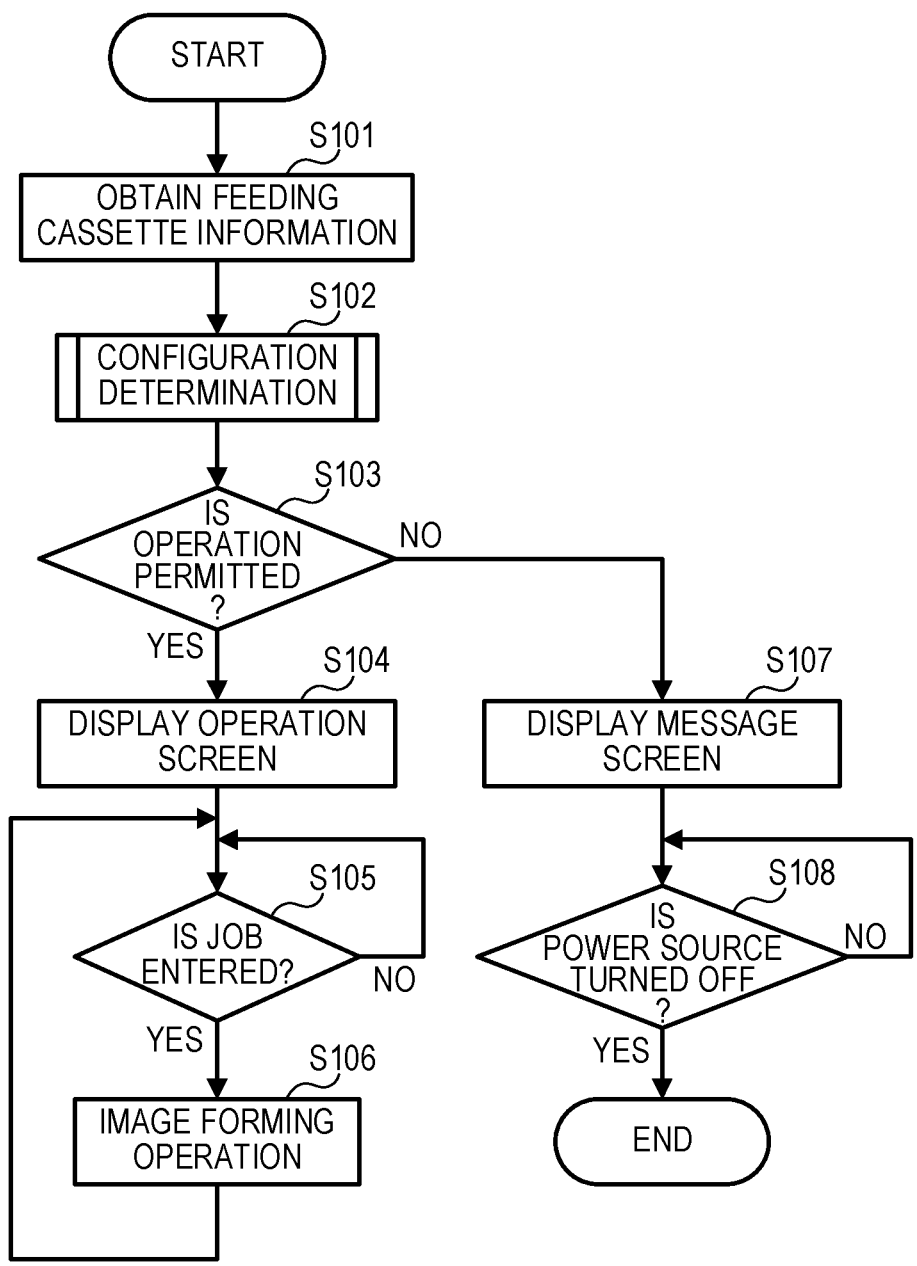
FIG. 5 is a flowchart showing an image forming operation of the image forming apparatus.

The image forming operation of the image forming apparatus 100 will be described with reference to FIG. 5. FIG. 5 is a flowchart showing the image forming operation of the image forming apparatus 100. When the power source of the image forming apparatus 100 is turned on, the CPU 300 executes the image forming operation shown in FIG. 5 based on the program stored in the ROM 301.

The CPU 300 obtains the feeding cassette information stored in the RAM 302 (S101). The feeding cassette information includes information on whether the second optional cassette 192 is connected to the image forming apparatus 100 detected by the feeding cassette detector 305 and information on the number E of the first optional cassettes 191 connected to the image forming apparatus 100. The CPU 300 as the determination portion executes a configuration determination for determining whether or not the operation of the image forming apparatus 100 is permitted based on the feeding cassette information when the image forming apparatus 100 is started (S102). The configuration determination in S102 will be described later.

The CPU 300 determines whether or not the operation of the image forming apparatus 100 is permitted based on the result of the configuration determination in S102 (S103). In a case in which the operation is permitted (YES in S103), the CPU 300 displays the operation screen 310 as shown in FIG. 4A on the operation portion 304 (S104). The CPU 300 determines whether or not a job has been entered (S105). In a case in which the job has not been entered (NO in S105), the CPU 300 waits for the job to be entered (S105). In a case in which the job is entered (YES in S105), the CPU 300 executes the image forming operation (S106). After the image forming operation is executed, the CPU 300 returns the process to S105.

In a case in which the operation of the image forming apparatus 100 is not permitted (NO in S103), the CPU 300 displays the message screen 311 as shown in FIG. 4B on the operation portion 304 (S107). When the message screen 311 is displayed on the operation portion 304, the operation of the image forming apparatus 100 is prohibited. In this case, the state of the image forming apparatus 100 cannot be changed except that the power source of the image forming apparatus 100 is turned off. The CPU 300 determines whether or not the power source of the image forming apparatus 100 is turned off (S108). In a case in which the power source is not turned off (NO in S108), the CPU 300 waits for the power source to be turned off (S108). When the power source is turned off (YES in S108), the CPU 300 ends the image forming operation. Thereafter, when the power source is turned on, the CPU 300 starts the image forming operation and executes the processing from S101.

(Configuration Determination)

Figure 6:
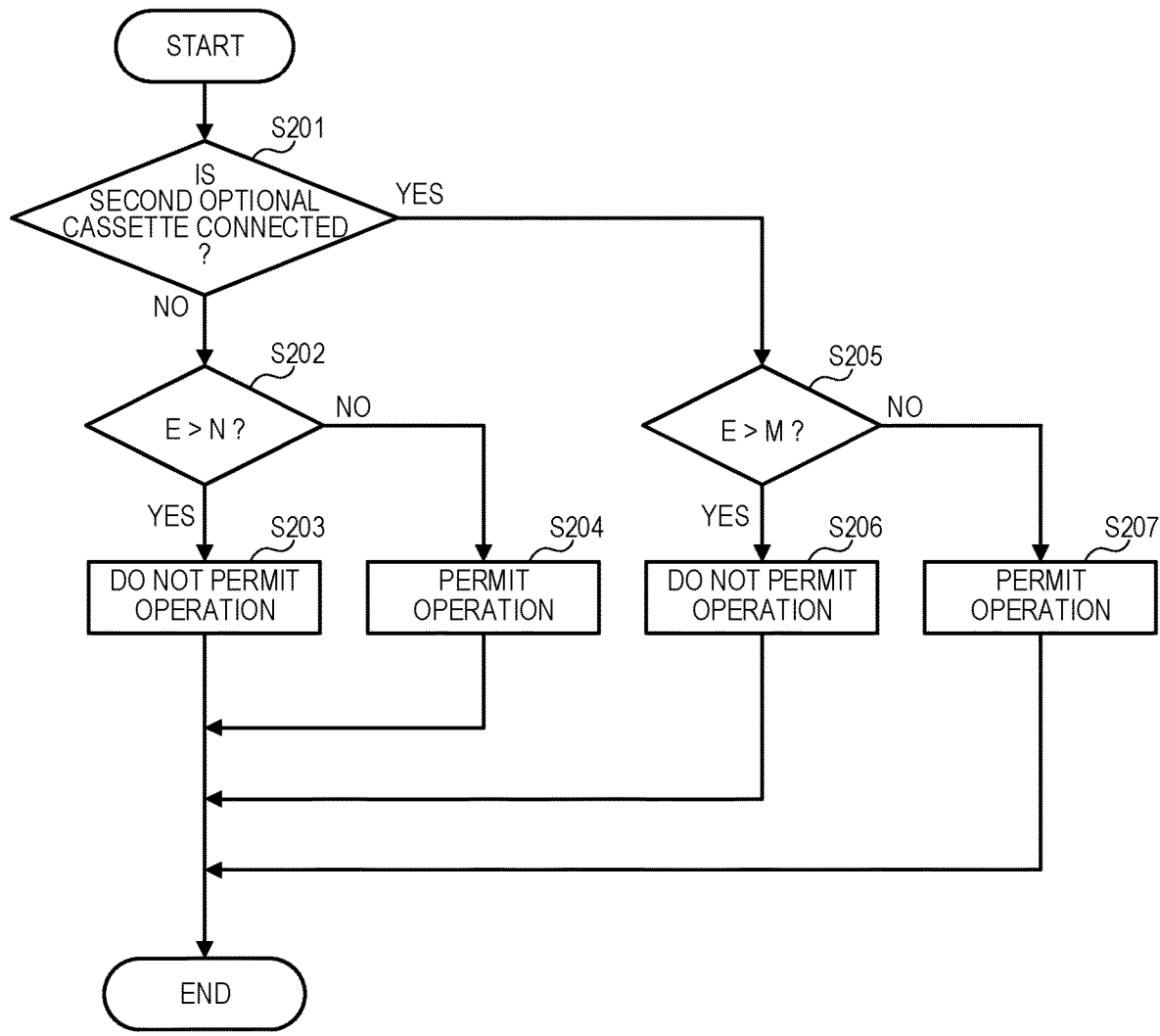
FIG. 6 is a flowchart showing a configuration determination.

Next, the configuration determination in S102 will be described with reference to FIG. 6. FIG. 6 is a flowchart showing the configuration determination. In the following description, a first set number (first threshold value) N is a number (allowable connection number) of the first optional cassettes 191 that are allowed to be connected to the image forming apparatus 100 in a case in which the second optional cassette 192 is not connected to the image forming apparatus 100. A second set number (second threshold value) M is a number (allowable connection number) of the first optional cassettes 191 that are permitted to be connected to the image forming apparatus 100 in a case in which the second optional cassettes 192 are connected to the image forming apparatus 100.

When the configuration determination is started, the CPU 300 determines whether the second optional cassette 192 is connected to the image forming apparatus 100 (S201). In a case in which the second optional cassette 192 is not connected to the image forming apparatus 100 (NO in S201), the CPU 300 advances the process to S202. The CPU 300 determines whether the number E of the first optional cassettes 191 connected to the image forming apparatus 100 is larger than the first set number N (S202). In a case in which the number E of the first optional cassettes 191 connected to the image forming apparatus 100 is larger than the first set number N (YES in S202), the CPU 300 does not permit the operation of the image forming apparatus 100 (S203). On the other hand, in a case in which the number E of the first optional cassettes 191 connected to the image forming apparatus 100 is equal to or smaller than the first set number N (equal to or smaller than the first threshold value) (NO in S202), the CPU 300 permits the operation of the image forming apparatus 100 (S204).

In a case in which the second optional cassette 192 is connected to the image forming apparatus 100 (YES in S201), the CPU 300 advances the process to S205. The CPU 300 determines whether the number E of the first optional cassettes 191 connected to the image forming apparatus 100 is larger than the second set number M (S205). In a case in which the number E of the first optional cassettes 191 connected to the image forming apparatus 100 is larger than the second set number M (YES in S205), the CPU 300 does not permit the operation of the image forming apparatus 100 (S206). On the other hand, in a case in which the number E of the first optional cassettes 191 connected to the image forming apparatus 100 is equal to or smaller than the second set number M (equal to or smaller than the second threshold value) (NO in S205), the CPU 300 permits the operation of the image forming apparatus 100 (S207).

(Explanation of the First and Second Set Numbers)

Figure 7:
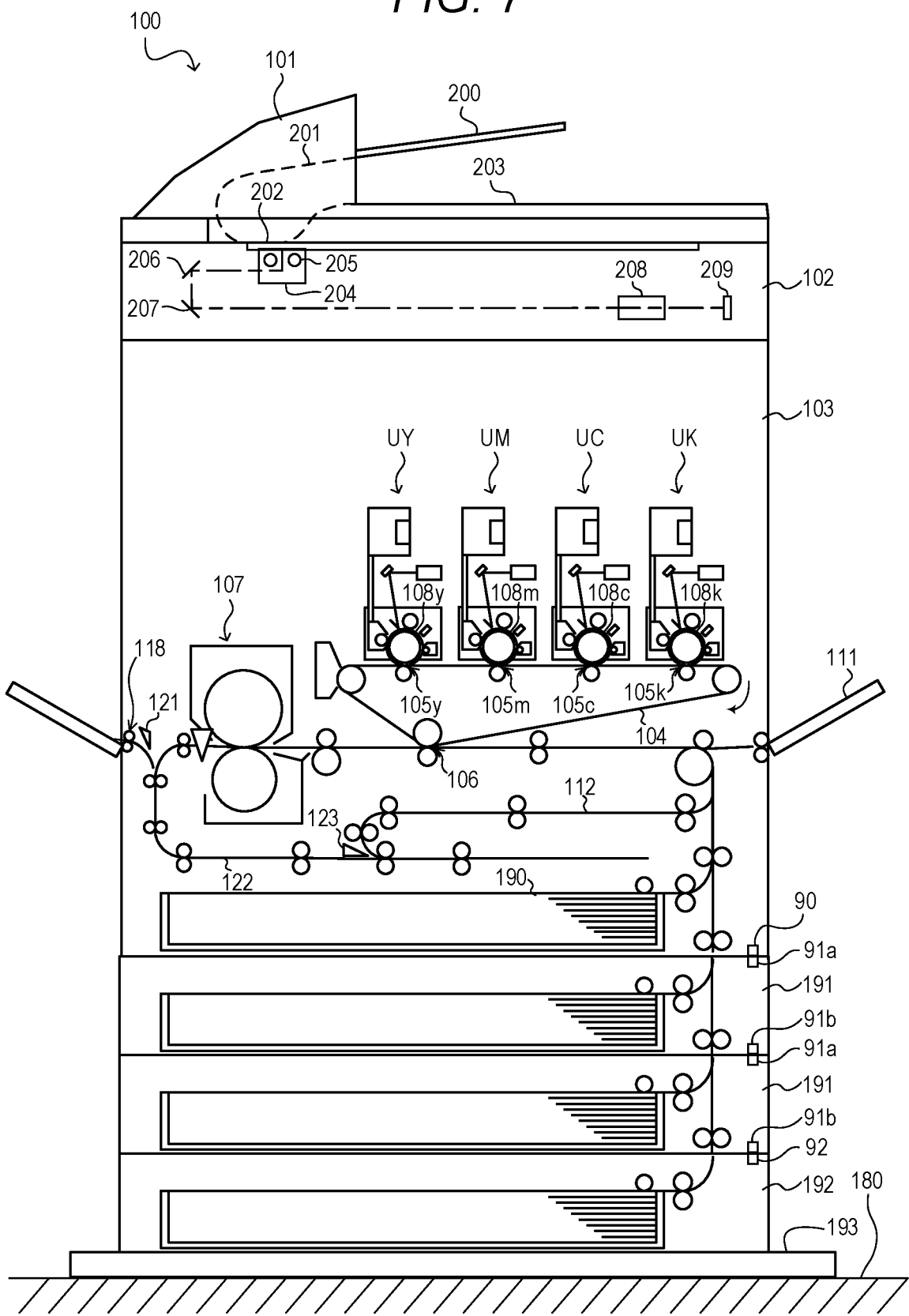
FIG. 7 is a view showing a first configuration example of the image forming apparatus.
Figure 8:
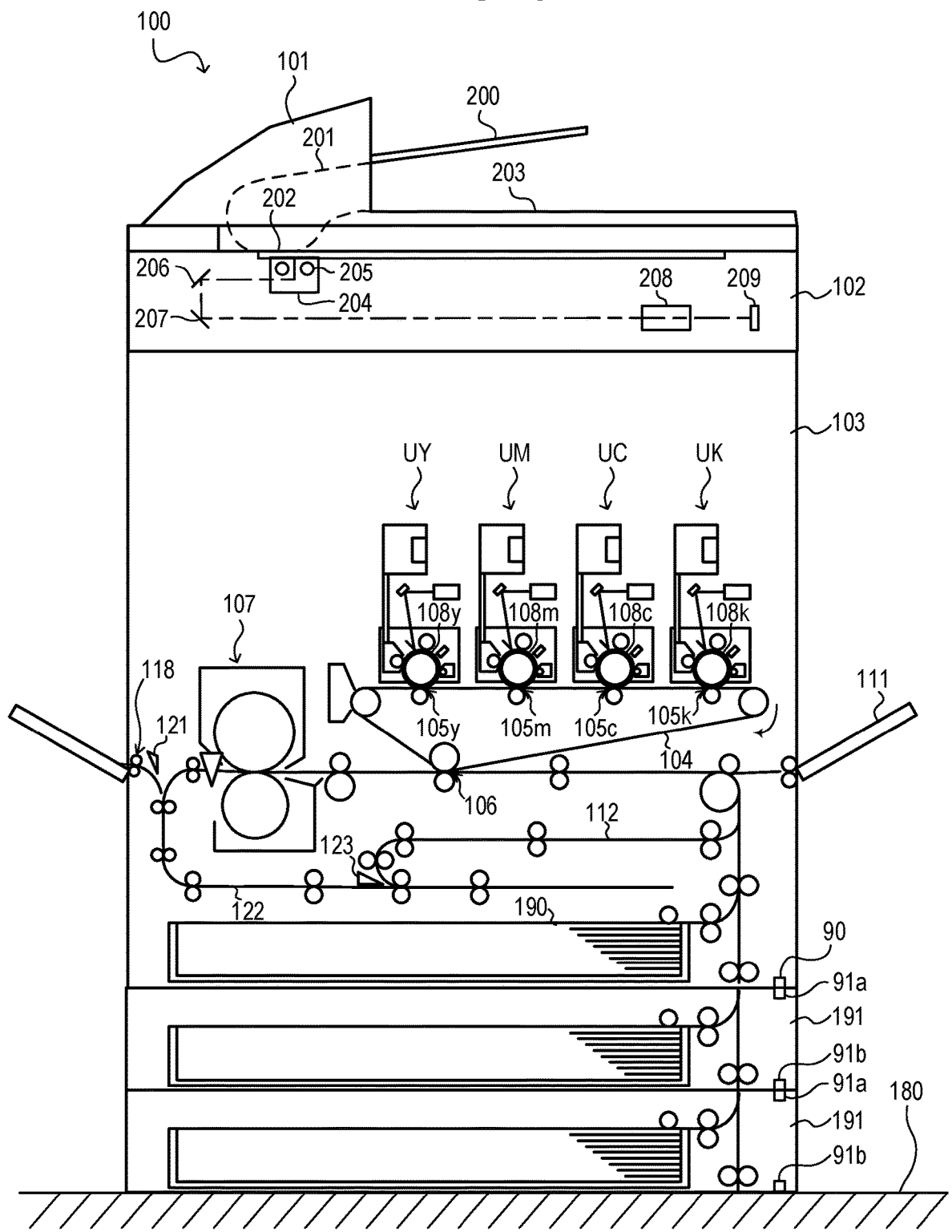
FIG. 8 is a view showing a second configuration example of the image forming apparatus.
Figure 9:
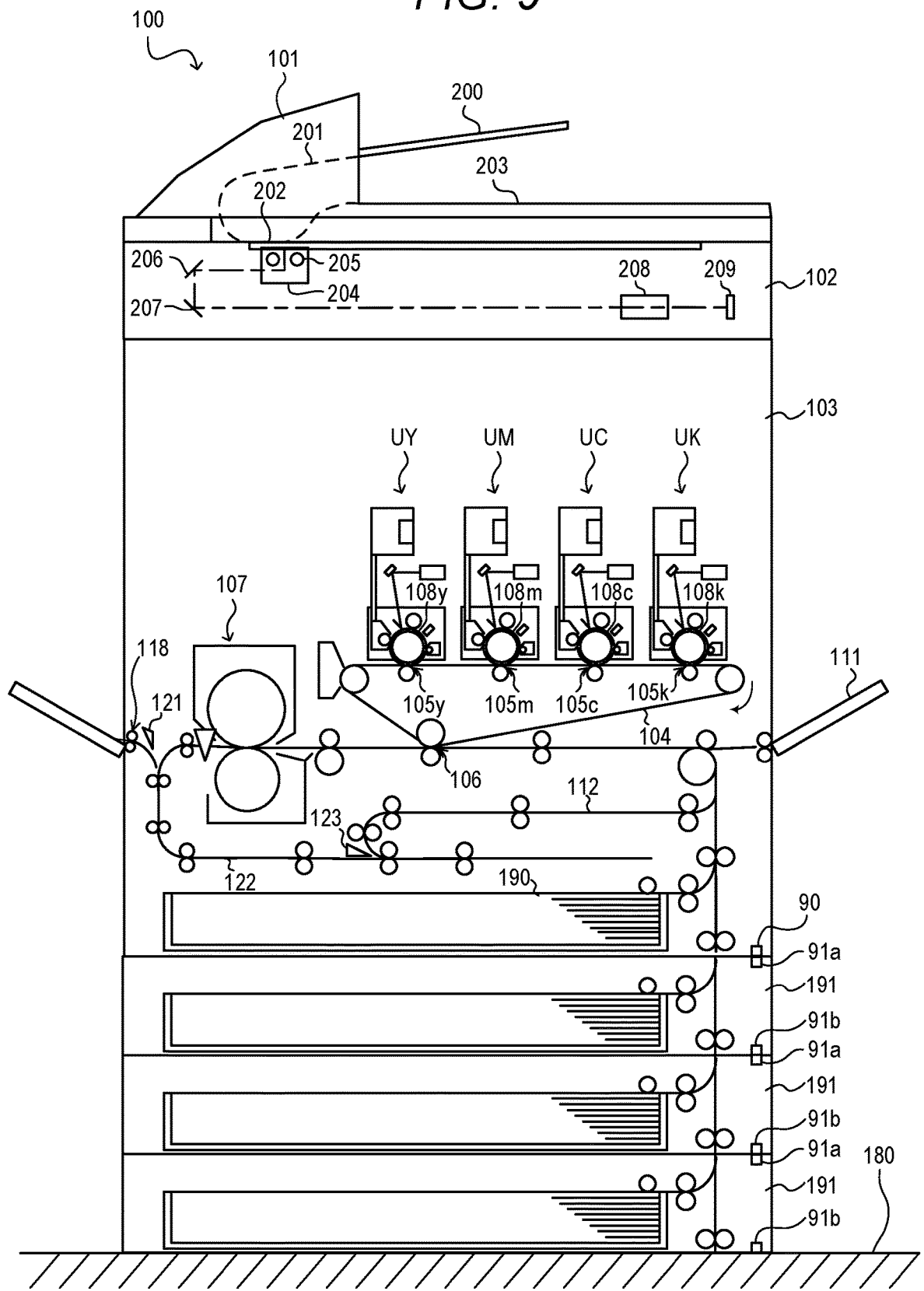
FIG. 9 is a view showing a third configuration example of the image forming apparatus.

With reference to FIG. 7, FIG. 8 and FIG. 9, the first set number N and the second set number M will be described. FIG. 7 is a view showing a first configuration example of the image forming apparatus 100. In the first configuration example, the second optional cassette 192 and the two first optional cassettes 191 are connected to the image forming apparatus 100. The second optional cassette 192 is installed on the floor 180. FIG. 8 is a view showing a second configuration example of the image forming apparatus 100. In the second configuration example, the second optional cassette 192 is not connected to the image forming apparatus 100, and the two first optional cassettes 191 are connected to the image forming apparatus 100. The lowermost first optional cassette 191 is installed on the floor 180. FIG. 9 is a view showing a third configuration example of the image forming apparatus 100. In the third configuration example, the second optional cassette 192 is not connected to the image forming apparatus 100, and the three first optional cassettes 191 are connected to the image forming apparatus 100. The lowermost first optional cassette 191 is installed on the floor 180.

For example, a case in which the first set number N is 1 and the second set number M is 1 (N=1, M=1) will be described. In the first configuration example shown in FIG. 7, since the second optional cassette 192 is connected to the image forming apparatus 100 (YES in S201), the number E of the first optional cassettes 191 connected to the image forming apparatus 100 and the second set number M are compared (S205). Since E=2 and M=1, E>M (YES in S205), the operation of the image forming apparatus 100 is not permitted (S206). In the second configuration example shown in FIG. 8, since the second optional cassette 192 is not connected to the image forming apparatus 100 (NO in S201), the number E of the first optional cassettes 191 connected to the image forming apparatus 100 and the first set number N are compared (S202). Since E=2 and N=1, E>N (YES in S202), and the operation of the image forming apparatus 100 is not permitted (S203). In the third configuration example shown in FIG. 9, since the second optional cassette 192 is not connected to the image forming apparatus 100 (NO in S201), the number E of the first optional cassettes 191 connected to the image forming apparatus 100 and the first set number N are compared (S202). Since E=3 and N=1, E>N (YES in S202), and the operation of the image forming apparatus 100 is not permitted (S203). That is, in all the configuration examples shown in FIG. 7, FIG. 8, and FIG. 9, the operation of the image forming apparatus 100 is not permitted.

For example, a case where the first set number N is 1 and the second set number M is 2 (N=1, M=2) will be described. In the first configuration example shown in FIG. 7, since the second optional cassette 192 is connected to the image forming apparatus 100 (YES in S201), the number E of the first optional cassettes 191 connected to the image forming apparatus 100 and the second set number M are compared (S205). Since E=2 and M=2, E=M (NO in S205), the operation of the image forming apparatus 100 is permitted (S207). In the second configuration example shown in FIG. 8 and the third configuration example shown in FIG. 9, the second optional cassette 192 is not connected to the image forming apparatus 100 (NO in S201). The number E of the first optional cassettes 191 connected to the image forming apparatus 100 and the first set number N are compared (S202). Since the first set number N is 1, the operation of the image forming apparatus 100 is not permitted in the second configuration example and the third configuration example as described above (S203). That is, in the first configuration example shown in FIG. 7, the operation of the image forming apparatus 100 is permitted, but in the second configuration example shown in FIG. 8 and the third configuration example shown in FIG. 9, the operation of the image forming apparatus 100 is not permitted.

For example, a case where the first set number N is 2 and the second set number M is 2 (N=2, M=2) will be described. Since the second set number M is 2, as described above, in the first configuration example shown in FIG. 7, since E=2 and M=2, E=M is obtained (NO in S205), and the operation of the image forming apparatus 100 is permitted (S207). In the second configuration example shown in FIG. 8, since the second optional cassette 192 is not connected to the image forming apparatus 100 (NO in S201), the number E of the first optional cassettes 191 connected to the image forming apparatus 100 and the first set number N are compared (S202). Since E=2 and N=2, E=N (NO in S202), and the operation of the image forming apparatus 100 is permitted (S204). In the third configuration example shown in FIG. 9, since the second optional cassette 192 is not connected to the image forming apparatus 100 (NO in S201), the number E of the first optional cassettes 191 connected to the image forming apparatus 100 and the first set number N are compared (S202). Since E=3 and N=2, E>N (YES in S202), the operation of the image forming apparatus 100 is not permitted (S203). That is, the operation of the image forming apparatus 100 is permitted in the first configuration example shown in FIG. 7 and the second configuration example shown in FIG. 8, and the operation of the image forming apparatus 100 is not permitted in the third configuration example shown in FIG. 9.

The second set number M may be the same as or different from the first set number N. The second set number M may be larger than the first set number N. This is because the installation floor area of the second optional cassette 192 is larger than the installation floor area of the first optional cassette 191, so that the image forming apparatus 100 is more stable when the second optional cassette 192 is connected.

As described above, the use of the image forming apparatus 100 having the configuration in which the operation is permitted is permitted to the user, and the use of the image forming apparatus 100 having the configuration in which the operation is not permitted is not permitted to the user, and it is possible to prompt the user to change the stacking state of the optional cassettes. That is, by prohibiting the use of the image forming apparatus 100 in the case of a configuration in which there is a risk of toppling, it is possible to cause the user to change the configuration to a more stable configuration and use the image forming apparatus 100.

The second optional cassette 192 of the embodiment has a larger installation floor area than the first optional cassette 191. However, as it suffices that the second optional cassette 192 is configured to be less prone to toppling than the first optional cassette 191, the second optional cassette 192 may be configured to have a lower center of gravity than the first optional cassette 191.

(Optional Cassette with Casters)

Figure 10A:
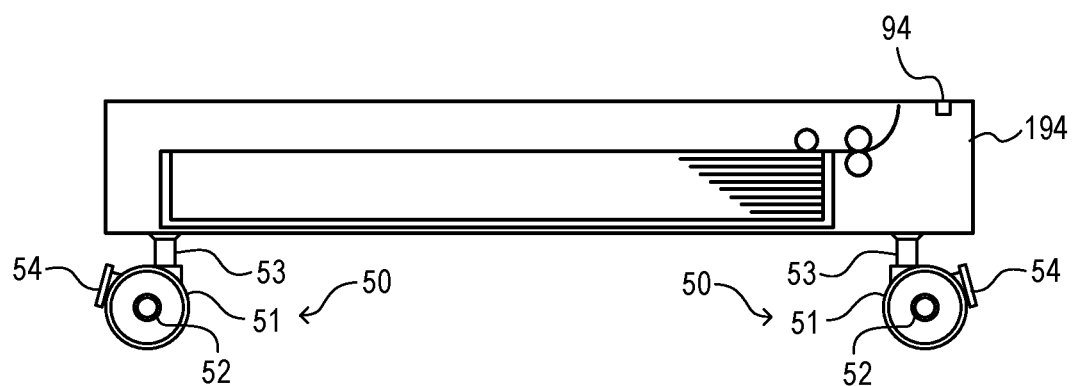
FIG. 10A and FIG. 10B are cross-sectional views of optional cassettes with casters.
Figure 10B:
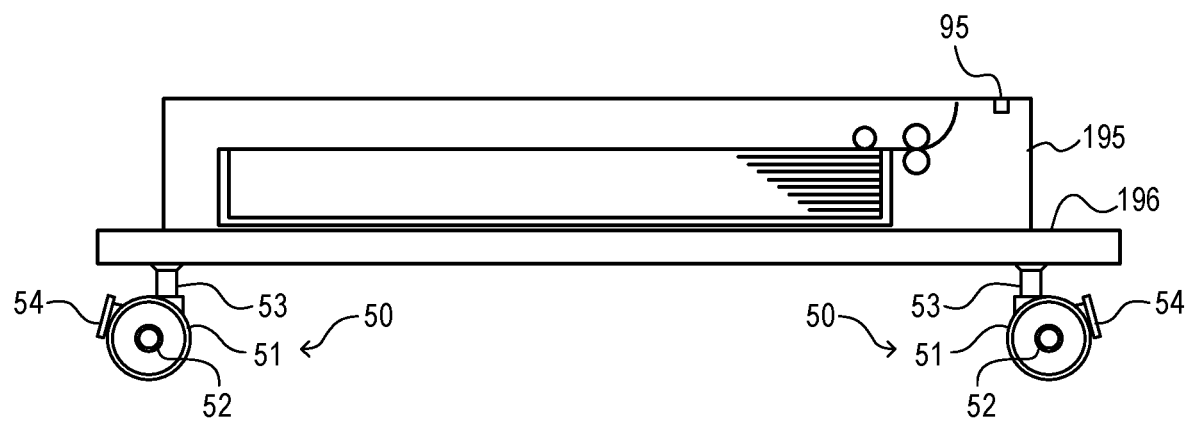

As it suffices that the second optional cassette 192 is configured to be less prone to toppling than the first optional cassette 191, the second optional cassette 192 may have wheels with stoppers. FIG. 10A and FIG. 10B are cross-sectional views of optional cassettes with casters (194, 195). FIG. 10A is a cross-sectional view of a third optional cassette 194. An electrical contact 94 is provided on an upper portion of the third optional cassette 194. At a bottom portion of the third optional cassette 194, four casters 50 are provided. FIG. 10B is a cross-sectional view of a fourth optional cassette 195. An electrical contact 95 is provided on an upper portion of the fourth optional cassette 195. A bottom plate 196 having an installation floor area larger than an installation floor area of the bottom portion of the third optional cassette 194 is provided at a bottom portion of the fourth optional cassette 195. A bottom portion of the bottom plate 196 is provided with four casters 50.

The third optional cassette 194 is connectable to the bottom portion of the image forming apparatus 100 or the bottom portion of the first optional cassette 191 connected to the image forming apparatus 100. The electrical contact 94 of the third optional cassette 194 is connected to the electrical contact 90 of the image forming apparatus 100 or the electrical contact 91b of the first optional cassette 191. Thus, the feeding cassette detector 305 detects that the third optional cassette 194 is connected to the image forming apparatus 100. The fourth optional cassette 195 is connectable to the bottom portion of the image forming apparatus 100 or to the bottom portion of the first optional cassette 191 connected to the image forming apparatus 100. The electrical contact 95 of the fourth optional cassette 195 is connected to the electrical contact 90 of the image forming apparatus 100 or the electrical contact 91b of the first optional cassette 191. Thus, the feeding cassette detector 305 detects that the fourth optional cassette 195 is connected to the image forming apparatus 100.

The caster 50 has a wheel 51, a rotary shaft 52, a pivot shaft 53, and a stopper 54. The wheel 51 is rotatable about the rotary shaft 52 and pivotable about the pivot shaft 53. The stopper 54 is movable to a position in which rotation and pivoting of the wheel 51 are prohibited and a position in which the rotation and pivoting of the wheel 51 are permitted. The image forming apparatus 100 to which the third optional cassette 194 or the fourth optional cassette 195 is connected is easily movable by the casters 50. After the image forming apparatus 100 is installed, the rotation and pivoting of the casters 50 are prohibited by the stoppers 54, and the image forming apparatus 100 is installed stably so as not to move.

In a case in which the third optional cassette 194 is connected to the image forming apparatus 100, the number (allowable connection number) of the first optional cassettes 191 that are permitted to be connected to the image forming apparatus 100 is set as the third set number (third threshold value) G. In a case in which the fourth optional cassette 195 is connected to the image forming apparatus 100, the number (allowable connection number) of the first optional cassettes 191 that are permitted to be connected to the image forming apparatus 100 is set to the fourth set number (fourth threshold value) K. The fourth set number K may be the same as or different from the third set number G. The fourth set number K may be larger than the third set number G. Because the installation floor area of the fourth optional cassette 195 is larger than the installation floor area of the third optional cassette 194, the image forming apparatus 100 is more stable in the case in which the fourth optional cassette 195 is connected. The third set number G may be the same as or different from the first set number N. The first set number N may be larger than the third set number G. This is because the first optional cassette 191 is installed directly on the floor and is therefore more stable. The fourth set number K may be the same as or different from the second set number M. The second set number M may be larger than the fourth set number K. This is because the second optional cassette 192 is installed directly on the floor and is therefore more stable.

In the embodiment, it is determined whether or not to permit the operation of the image forming apparatus 100 based on whether or not the first optional cassette 191, the second optional cassette 192, the third optional cassette 194 and/or the fourth optional cassette 195 are connected to the image forming apparatus 100. However, it is not limited to the optional cassette, and it may be determined whether an optional device such as an image reader (image reading apparatus), a finisher (post-processing apparatus), or an automatic original feeder is connected to the image forming apparatus 100. In a case in which there is a risk that the image forming apparatus 100 is concerned to topple because the optional device (connection option) is connected to the image forming apparatus 100, the operation of the image forming apparatus 100 may be prohibited.

According to the present embodiment, it is possible to provide an image forming apparatus of which an operation is prohibited in a case in which optional devices of a number larger than a threshold value are connected to the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-014396, filed Feb. 1, 2021, which is hereby incorporated by reference herein in its entirety.

What is claimed is:

1. An image forming apparatus, comprising:
an image forming portion configured to form an image on a sheet;
a connection portion to which a first optional device and a second optional device are selectively detachably connectable; and
a determination portion configured to determine whether to prohibit an operation of the image forming apparatus,
wherein the first optional device is connectable to the connection portion of the image forming apparatus,
wherein the first optional device is connectable to another first optional device so that a plurality of first optional devices are stacked and connectable to the image forming apparatus,
wherein the second optional device is installed on a floor and is connectable to the connection portion of the image forming apparatus or the first optional device,
wherein in a case in which the second optional device is not connected to the image forming apparatus and a number of the first optional devices connected to the image forming apparatus is larger than a first threshold value, the determination portion prohibits the operation of the image forming apparatus, and
wherein in a case in which the second optional device is connected to the image forming apparatus and the number of the first optional devices connected to the image forming apparatus is larger than a second threshold value, the determination portion prohibits the operation of the image forming apparatus.

2. The image forming apparatus according to claim 1, wherein an installation floor area of the second optional device is larger than an installation floor area of the first optional device.

3. The image forming apparatus according to claim 1, wherein a center of gravity of the second optional device is lower than a center of gravity of the first optional device.

4. The image forming apparatus according to claim 1, wherein the second optional device is provided with wheels.

5. The image forming apparatus according to claim 1, wherein the second threshold value is equal to or smaller than the first threshold value.

6. The image forming apparatus according to claim 1, further comprising an operation portion configured to set the operation of the image forming apparatus,
wherein in a case in which the determination portion prohibits the operation of the image forming apparatus, the determination portion displays on the operation portion a display prompting to change a stacking state of the first optional devices.

7. The image forming apparatus according to claim 1, wherein the connection portion is provided at a bottom portion of the image forming apparatus, and
wherein the plurality of first optional devices are vertically stacked and connected below the image forming apparatus.

8. The image forming apparatus according to claim 1, wherein each of the first optional device and the second optional device is a feeding cassette having a sheet containing portion configured to contain the sheet and a feeding portion configured to feed the sheet one by one from the sheet containing portion.

9. An image forming apparatus, comprising:
an image forming portion configured to form an image on a sheet;
a connection portion to which an optional device is detachably connectable; and
a determination portion configured to determine whether to prohibit an operation of the image forming apparatus,
wherein a plurality of optional devices, each of which includes a sheet containing portion configured to contain the sheet on which the image is formed by the image forming portion, are stacked and connectable to the image forming apparatus,
wherein in a case in which a predetermined number of optional devices are connected to the image forming apparatus and the predetermined number of optional devices connected to the image forming apparatus are all of first type optional devices, the determination portion determines to prohibit the operation of the image forming apparatus, and
wherein in a case in which the predetermined number of optional devices are connected to the image forming apparatus and the predetermined number of optional devices connected to the image forming apparatus includes the first type optional device and a second type optional device installed on a floor different from the first type optional device, the determination portion does not prohibit the operation of the image forming apparatus.

10. The image forming apparatus according to claim 9, wherein an installation floor area of the second type optional device is larger than an installation floor area of the first type optional device.

11. The image forming apparatus according to claim 9, wherein a center of gravity of the second type optional device is lower than a center of gravity of the first type optional device.

12. The image forming apparatus according to claim 9, wherein the second type optional device is provided with wheels.

13. The image forming apparatus according to claim 9, further comprising an operation portion configured to set the operation of the image forming apparatus,
wherein in a case in which the determination portion prohibits the operation of the image forming apparatus, the determination portion displays on the operation portion a display prompting to change a stacking state of the optional devices.

14. The image forming apparatus according to claim 9, wherein the connection portion is provided at a bottom portion of the image forming apparatus, and wherein a plurality of first type optional devices are vertically stacked and connected below the image forming apparatus.

\* \* \* \* \*